Nov. 29, 1966  J. L. CLARK  3,288,901
METHOD OF MAKING CATHETER
Filed Feb. 24, 1964
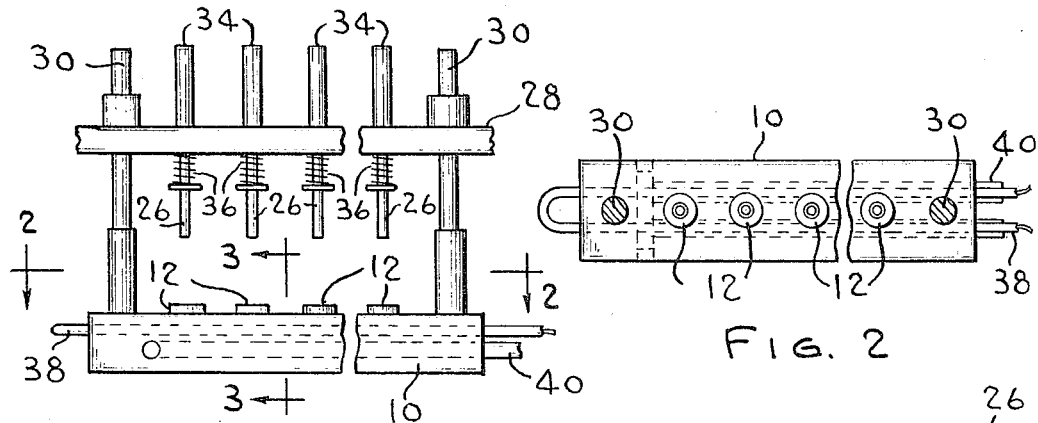
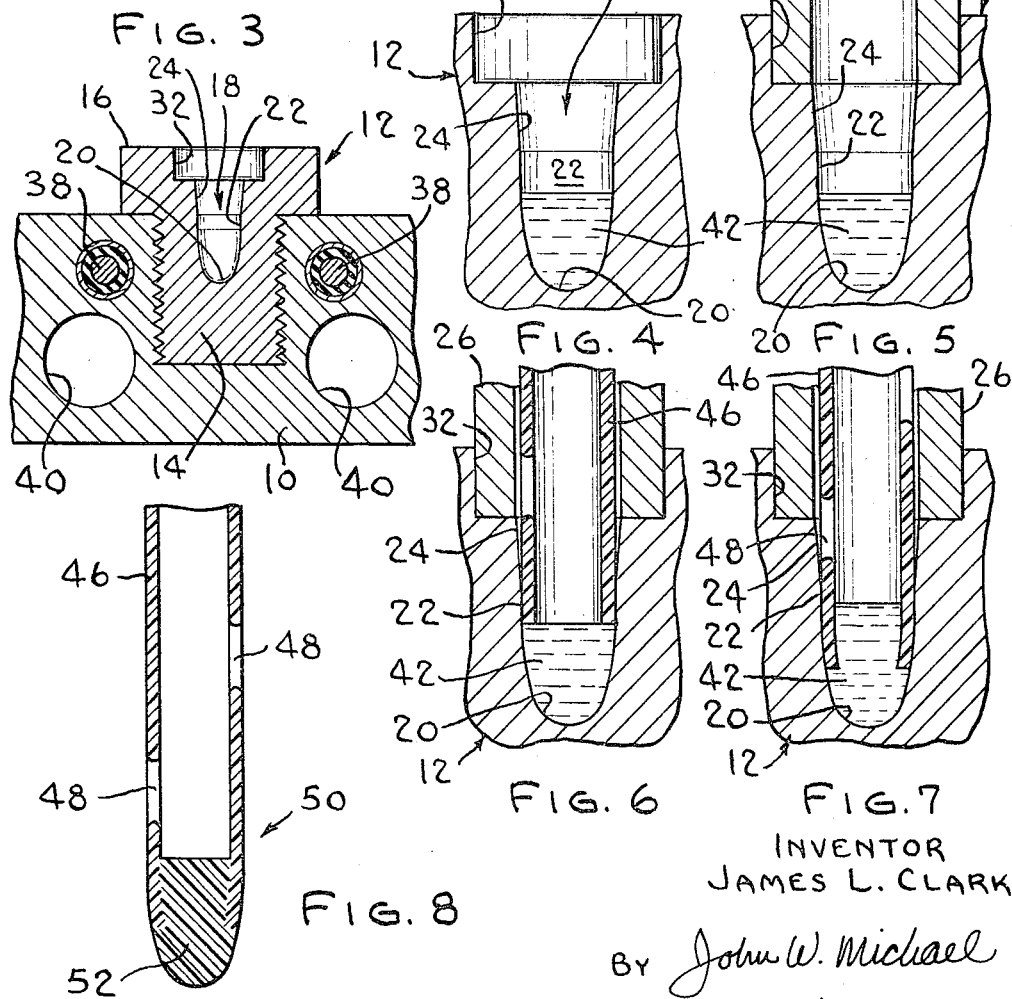
INVENTOR
JAMES L. CLARK
By John W. Michael
ATTORNEY 3,288,901
METHOD OF MAKING CATHETER
James L. Clark, Whitefish Bay, Wis., assignor, by mesne assignments, to Plastronics, Inc., Milwaukee, Wis., a corporation of Wisconsin
Filed Feb. 24, 1964, Ser. No. 346,888
4 Claims. (Cl. 264—267)

This invention relates to an improved catheter construction and the method of making same.

The present invention while not limited thereto is particularly directed to the manufacture of an improved "urinary" type catheter.

It is important in catheters of all types that the tip portion thereof be smoothly and symmetrically rounded and of sufficient rigidity to facilitate insertion thereof when used. It is also desirable that the tube portion of the catheter be of transparent material to permit visual monitoring of flow therethrough.

An important objective of this invention is to provide an improved method of making a catheter of the desired type wherein the steps involved not only insure reliable results from the standpoint of quality control but are also particularly well adapted to a mass production manufacture to thus reduce the cost.

Other objects and advantages will be pointed out in, or be apparent from, the specification and claims, as will obvious modifications of the single embodiment shown in the drawings, in which:

FIG. 1 is a side elevation view of apparatus of the type suitable for making the catheter of this invention;

FIG. 2 is a horizontal sectional view taken along line 2—2 of FIG. 1;

FIG. 3 is an enlarged vertical sectional view taken along line 3—3 of FIG. 1;

FIGS. 4-7 are enlarged sectional views similar to FIG. 3 showing some of the various steps employed in the method of the present invention; and FIG. 8 is an enlarged fragmentary sectional view of a completed catheter.

Referring now to the drawings in detail, the present invention can best be explained by describing the apparatus and the various steps employed in the manufacture of the improved catheter.

While apparatus of different types could be employed in the partice of my invention, one suitable arrangement is shown in FIGS. 1 and 2. Such apparatus includes a base or mold portion 10 having a plurality of mold elements 12 threaded therein as shown in FIG. 3. While only four mold elements 12 are shown mounted in base 10, it should be understood that in actual production equipment a great many more such elements would be employed.

Each mold element 12 is provided with a threaded tip portion 14, a collar portion 16 and a mold cavity 18. Cavity 18 is comprised of a smoothly rounded tip or bottom portion 20, a cylindrical portion 22 and a tapered portion 24 at the entrance to the cavity. Each mold element 12 is provided with a hollow guide member 26 slidably mounted in juxtaposition therewith by means of a support bar 28 and a pair of end posts 30, 30, as shown in FIG. 1. Guide members 26 are movable as a unit from the position shown in FIG. 1 to that shown in FIG. 5 wherein the lower end of each guide 26 seats in a countersunk portion 32 formed in each mold element at the entrance to each cavity 18. Hollow guide members 26 (having top portions 34 of increased diameter) are slidably mounted in bar 28 and biased downwardly therefrom by springs 36, as shown in FIG. 1.

The mold elements 12 are heated by an electric resistance type heating element 38 mounted in base 10 and cooling is provided by the circulation of a suitable cooling fluid through a conduit 40 in the base 10. While in the apparatus shown an electric heating element 38 is employed to heat elements 12, it should be understood that other means of heating could be employed such as gas, circulating a hot liquid, etc.

Having thus described one form of an apparatus suitable for performing the method of this invention, the steps employed in the performance of such method are as follows.

The first step is to introduce a suitable plastic material 42 into each mold cavity 18. This can be accomplished by any suitable means such as by an injector nozzle 44 as shown in FIG. 4. While various types of plastic material could be used, in the preferred embodiment of this invention a liquid vinyl plastisol is employed. The amount of liquid plastisol required will vary of course with the diameter of the catheter to be produced. In any event, as shown in FIG. 4 sufficient plastisol is introduced into cavity 18 to fill the rounded tip portion 20 of the cavity.

The next step is the insertion of a plastic tube 46 into cavity 18 as shown in FIGS. 6 and 7. This is accomplished by the use of guide members 26 which are lowered into countersunk portions 32 as shown in FIG. 5 after the liquid plastic material 42 has been introduced into cavities 18. With guide members so positioned tubes 46 are inserted through guide members 26 down into cavity 18 through tapered portion 24 and cylindrical portion 22 thereof to the position shown in FIG. 6. The tubes are then forced further into cavity 18 by gentle pressure to the position shown in FIG. 7 wherein the tip of the tube is pushed below the surface of liquid plastic material 42 thus causing such material to be forced upwardly a short distance inside the tube.

Clear vinyl plastic is the preferred tube material and, as shown in the drawings, each tube is provided with a plurality of flow openings 48 adjacent the lower end thereof. In making urinary type catheters, .184 inch O.D. tubing is commonly used and the tube end is inserted into the liquid plastic 42 so that the distance from the end of the tube to the tip of the curved portion 20 is about 1/8 inch and the distance the liquid plastic extends up into the tube is about 3/32 inch.

It should be noted at this point that while it is desirable that the liquid plastic be introduced into the mold before tube 46 is inserted therein, such steps could be reversed or performed simultaneously.

The third step of the method is the application of heat to the lower end of the tube and the liquid plastic to cure such liquid plastic and cause it and the tube end to fuse together. This is accomplished by passing an electric current through heating element 38 which will generate heat at each of the mold elements 12. It is important in the heating step that the plastic be heated at a relatively fast rate. In the preferred embodiment the parts are heated to a temperature of about 400° F. in a period of about 2½ minutes and then held at 400° F. for about one minute before the cooling step is indicated. It has been found that curing temperatures within the range of about 250°–450° F. and a heating rate of at least 30° F. per minute within the curing range may be employed with satisfactory results.

The final step is to cool the heated plastic causing the heated parts to harden to a firm consistency. This is accomplished by circulating a suitable heat exchange fluid such as certain oils, ethyl glycol, etc. through conduit 40 until the temperature of the heated plastic has been reduced to about room temperature. In the preferred embodiment the heated plastic is brought down from the preferred curing temperature of about 400° F.

to room temperature in about 2½ minutes. Just as in the heating cycle, it is desirable that the cooling rate be at least 30° F. per minute within the curing range.

The resultant product produced by the practice of the method described above is a completed catheter 50 (FIG. 8) having a tube portion 46 of clear plastic and a smoothly rounded tip portion 52 extending up inside the tube end and fused thereto along all contact areas. Tip portion 52 mates with the tube exterior without any ridge or groove to present a perfectly smooth exterior surface which terminates in a smoothly rounded curve at its tip. The tip portion 52 being of solid plastic material is of the proper rigidity to facilitate insertion of the tip into a body opening when used. In the preferred embodiment the tip 52 cures to a hardness of about durometer 77 on the Shore A scale.

Although but one embodiment of the present invention has been illustrated and described, it will be apparent to those skilled in the art that various changes and modifications may be made therein without departing from the spirit of the invention or from the scope of the appended claims.

I claim:

1. The method of making a catheter comprising the steps of:

introducing a liquid plastic material into a mold cavity having a smoothly rounded bottom portion;

inserting a plastic tube into the mold cavity so that the end of the tube is in contact with the liquid plastic in the mold;

heating the liquid plastic and tube end in the mold to cure the liquid plastic material and cause it and the tube end to fuse together, said liquid plastic and tube end being heated to a curing temperature within the range of about 250°–450° F. at a rate of at least 30° F. per minute within the curing range; and cooling the heated plastic to cause it to harden to a firm consistency.

2. The method according to claim 1 in which the heated plastic material is cooled at the rate of at least 30° F. per minute within the curing range.

3. The method of making a catheter comprising the steps of:

introducing a liquid plastic material into a mold cavity having a smoothly rounded bottom portion;

inserting a plastic tube into the mold cavity so that the end of the tube is in contact with the liquid plastic in the mold, said tube end being inserted into the liquid plastic in the mold so that a portion of the liquid plastic will extend up inside the tube and a portion will extend downwardly from the lower end of the tube into the rounded bottom of the mold cavity;

heating the liquid plastic and tube end in the mold to cure the liquid plastic material and cause it and the tube end to fuse together; and cooling the heated plastic to cause it to harden to a firm consistency.

4. The method of making a catheter comprising the steps of:

introducing a liquid plastic material into a mold cavity having a smoothly rounded bottom portion;

inserting a plastic tube into the cavity so that the end of the tube is in contact with the liquid plastic in the mold, said tube being inserted into the liquid plastic in the mold so that a portion of the liquid plastic will extend up inside the tube with the distance of the tube end to the top of the smoothly rounded bottom portion of the mold being about equal to the distance the liquid plastic extends up inside the tube;

heating the liquid plastic and tube end in the mold to cure the liquid plastic material and cause it and the tube end to fuse together; and cooling the heated plastic to cause it to harden to a firm consistency.

References Cited by the Examiner

UNITED STATES PATENTS

| | | | |
|---|---|---|---|
| 390,177 | 9/1888 | Lee | 128—349 |
| 1,774,874 | 9/1930 | Eatherton | 264—271 |
| 2,484,397 | 10/1949 | Barton. | |
| 2,561,569 | 7/1951 | Flynn | 128—349 X |
| 2,772,194 | 11/1956 | Fisher. | |
| 2,818,517 | 12/1957 | Loosjes | 264—271 |
| 2,855,631 | 10/1958 | Rowley. | |
| 2,892,458 | 6/1959 | Auzin | 128—349 |
| 2,947,035 | 8/1960 | Baker. | |
| 3,047,910 | 8/1962 | Downs. | |

ROBERT F. WHITE, *Primary Examiner.*

L. S. SQUIRES, *Assistant Examiner.*